United States Patent
Noldus et al.

(10) Patent No.: US 8,374,589 B2
(45) Date of Patent: Feb. 12, 2013

(54) CONTROLLING SUPPLEMENTARY SUBSCRIBER SERVICES IN OVERLAYED IMS-BASED TELECOMMUNICATIONS NETWORK

(75) Inventors: Rogier August Caspar Joseph Noldus, Goirle (NL); Andreas Witzel, Herzogenrath (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 519 days.

(21) Appl. No.: 12/527,315

(22) PCT Filed: Feb. 16, 2007

(86) PCT No.: PCT/EP2007/001371
§ 371 (c)(1),
(2), (4) Date: Feb. 24, 2010

(87) PCT Pub. No.: WO2008/098595
PCT Pub. Date: Aug. 21, 2008

(65) Prior Publication Data
US 2010/0167705 A1  Jul. 1, 2010

(51) Int. Cl.
*H04M 3/42* (2006.01)
(52) U.S. Cl. .................................. 455/414.1
(58) Field of Classification Search ........... 455/414.1
See application file for complete search history.

(56) References Cited

U.S. PATENT DOCUMENTS

| | | | | |
|---|---|---|---|---|
| 5,867,784 A * | 2/1999 | Lantto | ........................ | 455/432.2 |
| 6,101,387 A * | 8/2000 | Granberg et al. | ............. | 455/433 |
| 6,122,510 A * | 9/2000 | Granberg | ........................ | 455/433 |
| 6,212,395 B1 * | 4/2001 | Lu et al. | ........................ | 455/463 |
| 6,341,221 B1 * | 1/2002 | Huotari | ........................ | 455/414.1 |
| 6,640,108 B2 * | 10/2003 | Lu et al. | ........................ | 455/463 |
| 7,050,454 B1 | 5/2006 | Dzuban et al. | | |
| 7,369,848 B2 * | 5/2008 | Jiang | ........................ | 455/432.3 |
| 2003/0027569 A1 * | 2/2003 | Ejzak | ........................ | 455/432 |
| 2005/0250493 A1 * | 11/2005 | Elkarat et al. | ............. | 455/432.1 |
| 2008/0146221 A1 * | 6/2008 | Noldus | ........................ | 455/433 |

FOREIGN PATENT DOCUMENTS

WO  WO 03/071761 A  8/2003

* cited by examiner

*Primary Examiner* — Nathan Mitchell

(57) ABSTRACT

A method, arrangement and network entities for controlling supplementary subscriber services in first (1) and second (12) operatively connected, overlayed telecommunications networks. Supplementary subscriber services available to a subscriber (4) in the first telecommunications network (1) may be executed in the second telecommunications network (12). These supplementary subscriber services are controlled by the subscriber (4) from the first telecommunications network (1). The first telecommunications network (1) is provided with a supplementary subscriber services handling indicator (20), indicating in which one of the first (1) and second (12) telecommunications network a supplementary subscriber service of a subscriber (4) is to be executed. Based on this supplementary subscriber services handling indicator (20), while maintaining a user control interface in the first telecommunications network (1), supplementary subscriber services control messages are processed in the respective network (1; 12) in which a particular supplementary service is to be executed.

34 Claims, 5 Drawing Sheets

CONTROLLING SUPPLEMENTARY SUBSCRIBER SERVICES IN OVERLAYED IMS-BASED TELECOMMUNICATIONS NETWORK

FIELD OF THE INVENTION

The present invention relates to telecommunications systems and, more particularly, to the control of supplementary subscriber services in first and second operatively connected, overlayed telecommunications networks.

BACKGROUND OF THE INVENTION

To provide mobile subscribers having a subscription supported by a Public Land Mobile Network (PLMN), such as operating under the Global System for Mobile communications (GSM) standard, with multimedia telecommunications services, such as Internet, Voice-over-IP (VoIP), and many other existing and future services, separate multimedia subsystems have been developed.

The IP Multimedia Subsystem (IMS) is a standardised Next Generation Networking (NGN) architecture for telecommunication operators wishing to provide mobile and fixed multimedia services to their subscribers. IMS may operate as overlay network for existing mobile and fixed telecommunications networks and is a computer network which is built on top of another network. The term "overlay" entails that calls established in a first telecommunications network are "overlayed" to a second telecommunications network. Nodes in the overlay network can be thought of as being connected by data transfer links, each of which corresponds to a path, through many physical links, in the underlying network. IMS merges the internet with the cellular world; it uses cellular technologies to provide ubiquitous access and internet technologies to provide appealing services.

IMS provides network operators and service providers the ability to control and charge for individual services. In addition, users will be able to execute all their services when roaming as well as from their home networks.

To achieve these goals, IMS uses open standard IP protocols, defined by the Internet Engineering Task Force (IETF). A multimedia session between two IMS users, between an IMS user and a user on the internet, and between two users on the internet is established using exactly the same protocol. Moreover, the interfaces for service developers are also based on IP protocols.

When a mobile subscriber is subjected to service control in IMS, supplementary subscriber services such as, for example, Call Forwarding (CF) and Call Barring (CB), may be executed by IMS. That means that these supplementary subscriber services are no longer provisioned in the mobile telecommunications network of the subscriber, i.e. in the Home Location Register (HLR) in the case of an GSM network, for example, but only in IMS.

A mobile subscriber, for example, whose call forwarding and call barring services (and call control services) are moved to IMS, is accustomed to set, change and query his/her call forwarding and call barring services as specified by the mobile telecommunications system supporting the mobile subscriber. However, although the execution of these supplementary services is now provided by IMS, the control commands are still exchanged with the mobile telecommunications system, such as the HLR in the case of a GSM system, for example. However, the HLR does no longer hold the subscription data for the call forwarding and call barring services, because these subscription data have moved to IMS.

This may result in annoying service unavailability messages or the like, providing confusion with the subscriber and may lead to unsatisfactory subscriber experience, which may give rise to a negative attitude towards a telecommunication operator and/or the services provided.

Hence, the operator is impaired in his capability to offers seamless user experience when migrating GSM call control and GSM supplementary service control to IMS, for example. Seamless user experience is considered vital for the success of GSM-IMS overlay.

SUMMARY OF THE INVENTION

It is an object of the present invention to provide an improved method of controlling supplementary subscriber services in first and second operatively connected, overlayed telecommunications networks, wherein supplementary subscriber services available to a subscriber in the first telecommunications network may be executed in the second telecommunications network, and wherein the supplementary subscriber services are controlled by the subscriber from the first telecommunications network.

It is another object of the invention to provide an arrangement for controlling supplementary subscriber services in first and second operatively connected, overlayed telecommunications networks, wherein supplementary subscriber services available to a subscriber in the first telecommunications network may be executed in the second telecommunications network, and wherein the arrangement provides control of the supplementary subscriber services by the subscriber from the first telecommunications network.

The invention further provides network support hardware and software for operating in any or both of the first and second operatively connected, overlayed telecommunications networks, for controlling supplementary subscriber services executed in the second telecommunications networks by a subscriber from the first telecommunications network.

The method according to the invention, in its broadest aspect, is characterized in that the first telecommunications network is provided with a supplementary subscriber services handling indicator, indicating in which one of the first and second telecommunications network a supplementary subscriber service of a subscriber is to be executed.

With the new supplementary subscriber services handling indicator, if applicable for a subscriber, network support nodes involved in the support of supplementary subscriber services in both the first and the second telecommunications networks can be suitably arranged for handling subscriber control of the supplementary subscriber services from the first network while the execution of these services has actually moved from the first to the second telecommunication network, without generating fault or other user annoying messages. Moreover, because the control over the supplementary subscriber services can be exercised from the first network, a user may experience the same look and feel as if the services were actually executed by the first telecommunications network.

Supplementary subscriber services control messages relating to a particular supplementary subscriber service are, for example, erase, activate, deactivate, interrogate, get password, register password, etcetera.

The first telecommunications network may be an existing mobile telecommunications network, such as a cellular GSM PLMN or any other circuit switched or packet switched telecommunications network, and the second telecommunications network may be the IMS or any other network providing IP multimedia services to subscribers of the PLMN or Public Switched Telephone Network (PSTN) or any other circuit switched or packet switched telecommunications network.

In an embodiment of the method according to the invention, the supplementary subscriber services handling indicator, at the receipt of a supplementary subscriber services control message of a subscriber in the first telecommunications network, is checked to determine in which one of the first and second telecommunications network the supplementary subscriber services control message has to be processed, and whether the subscriber services control message has to be forwarded for processing by the second telecommunications network dependent on the supplementary subscriber services handling indicator.

The supplementary subscriber services handling indicator is set for processing of a supplementary subscriber services control message by the second telecommunications network, if the supplementary subscriber service to which the supplementary subscriber services control message relates is executed by the second telecommunications network. Otherwise, the supplementary subscriber services handling indicator is set for processing of the supplementary subscriber services control message by the first telecommunications network. That is anyhow the case for the supplementary subscriber services that remain executed by the first telecommunications network.

If the first telecommunications network is a GSM network, for example, when the supplementary subscriber services handling indicator indicates that the supplementary subscriber services control message(s) shall be processed by the first telecommunications network, then most of the supplementary subscriber services control messages will be forwarded to the HLR and some of the supplementary subscriber services control messages will be handled locally in the serving Mobile Switching Center (MSC), i.e. the MSC receiving the supplementary subscriber services control message from the subscriber terminal.

In a further embodiment of the method according to the invention, the supplementary subscriber services handling indicator is arranged for indicating that each supplementary subscriber services control message is to be forwarded to the second telecommunications network, and wherein the second telecommunications network is arranged for forwarding to the first telecommunications network a supplementary subscriber services control message relating to a supplementary subscriber service not envisaged to be executed by the second telecommunications network.

Because it is foreseen that in future more and more existing and new supplementary subscriber services will be executed by an IP network, such as IMS, the invention proposes to set the supplementary subscriber services handling indicator to forward all supplementary subscriber services control messages invoked in the first telecommunications network to the second telecommunications network, i.e. the IMS, for example. The second telecommunications network then should be arranged to forward to the first telecommunications network the supplementary subscriber services control messages of those supplementary subscriber services which are still executed in the first telecommunications network.

This embodiment is advantageous in that it is not only future proof, but also in that the IMS, for example, is more versatile to implement supplementary subscriber service handling than the GSM network, for example.

It is envisaged, by this embodiment of the invention, that the supplementary subscriber services handling indicator indicates that each supplementary subscriber services control message shall be first forwarded to an entity in the first telecommunications network, such as the HLR in a GSM network. This entity, i.e. the HLR, subsequently forwards the supplementary subscriber services control messages to the second telecommunications network.

From an MSC's perspective, the supplementary subscriber services handling indicator indicates, in this particular embodiment, just that the supplementary subscriber services control message(s) shall be sent to HLR. However, from a network-wide perspective, the supplementary subscriber services handling indicator indicates that all the supplementary subscriber services control messages have to be sent to the second telecommunications network (with the aid of the HLR).

In the case of GSM-IMS overlay networks, for example, the supplementary subscriber control message in the GSM network is exchanged using Mobile Application Part (MAP) signaling. The actual service handling in IMS is represented as eXtensible Markup Language (XML) files, such that a conversion from MAP to XML and vice versa is required. By forwarding supplementary subscriber service control messages to IMS, this conversion can be effectively implemented in an IMS server, for example.

In a refined embodiment of the invention, the supplementary subscriber services handling indicator is arranged for selectively indicating which supplementary subscriber services control message is to be forwarded to which one of the first and second telecommunications network, i.e. per supplementary subscriber service. The supplementary subscriber services handling indicator may be arranged in a matrix form, including a one-dimensional matrix. Specifying the services exactly reduces the load on the signaling in the first network, if required.

At the start of the GSM-IMS overlay, it is envisaged that same may be restricted to voice services, such that particular supplementary subscriber services, such as call forwarding and call barring of voice services are executed by IMS, i.e. the second telecommunications network, while call forwarding and call barring for non-voice services, such as fax and video telephony are implemented and completely handled by the GSM network, i.e. the first telecommunications network.

In order to be able to distinguish for the handling of basic services such as voice and non-voice services and the like of a particular supplementary subscriber service in a particular telecommunications network, in a yet further embodiment of the invention, the supplementary subscriber services handling indicator may be arranged for selectively indicating which supplementary subscriber services control message relating to a specific basic service of a supplementary subscriber service is to be forwarded to which one of the first and second telecommunications network. Examples of basic services are voice, fax, synchronous data transfer and like communications.

The supplementary subscriber services handling indicator in accordance with the present invention may be stored in a register of the first telecommunications network associated with a subscriber identification, for example in the form of a look-up table.

The register may be arranged, in accordance with the invention, for sending the supplementary subscriber services handling indicator to an entity of the first telecommunications network, such as a network switching node, for example an MSC of a GSM network, providing call handling support to a subscriber of the first telecommunications network.

In an embodiment of the invention, the register may be arranged for converting a supplementary subscriber services control message received in the first telecommunications network for processing in the second telecommunications network, and for converting a response message received from the second telecommunications network into a response message for processing in the first telecommunications network. In the case of GSM-IMS overlay networks, for example, the register provides for a conversion from MAP to XML and vice versa.

If the first telecommunications network is a GSM PLMN, for example, the register may be advantageous the Number Portability Signaling Relay Function (NPSRF) register of the PLMN, arranged for determining an HLR of each subscriber of the PLMN.

In existing GSM networks, the NPSRF is arranged for determining the HLR of a subscriber. To this end, the NPSRF is arranged to intercept MAP signaling. Because the NPSRF already holds data for each subscriber, based on an International Mobile Subscriber Identity (IMSI) or a Mobile Station Integrated Services Digital Network (MSISDN) reference, it is very advantageous and efficient to implement the supplementary subscriber services handling indicator in accordance with the invention in the NPSRF.

In an alternative embodiment of the invention, wherein the first telecommunications network is a Public Land Mobile Network, such as operating in accordance with the GSM standard, the register in which the supplementary subscriber services handling indicator is stored is the HLR of a subscriber of the PLMN. The HLR contains an address of a service node in the second telecommunications network to which the respective supplementary subscriber services control messages have to be sent.

Those skilled in the art will appreciate that the PLMN may be any mobile network operating under any of circuit switched and/or packet switched transmission technologies, such as but not limited to mobile networks designated by the acronym UMTS, TDMA, CDMA, etcetera.

In accordance with the invention, the second telecommunications network may comprise a special data management server, arranged for executing a supplementary subscriber services control message forwarded by the first telecommunications system. The data management server may be arranged for converting a supplementary subscriber services control message forwarded by the first telecommunications network for executing by the second telecommunications network, as outlined above. Further, the data management server may be arranged for forwarding a supplementary subscriber services control message to the first telecommunications network relating to a supplementary subscriber service not envisaged to be executed by the second telecommunications network.

The invention further relates to an arrangement for controlling supplementary subscriber services in first and second operatively connected, overlayed telecommunications networks, wherein supplementary subscriber services available to a subscriber in the first telecommunications network may be executed in the second telecommunications network, and wherein the supplementary subscriber services are controlled by the subscriber from the first telecommunications network, characterized in that the first telecommunications network is arranged for storing a supplementary subscriber services handling indicator, indicating in which one of the first and second telecommunications network a supplementary subscriber service of a subscriber is to be executed.

The invention further provides for a Number Portability Signaling Relay Function NPSRF register for use in a PLMN, such as operating in accordance with the Global System for Mobile communications GSM, wherein the register is arranged for determining an HLR of each subscriber of the PLMN and for storing a supplementary subscriber services handling indicator, indicating in which one of the first and second telecommunications network a supplementary subscriber service of a subscriber is to be executed.

The invention also provides a Home Location Register HLR for use in a PLMN, such as operating in accordance with the Global System for Mobile communications GSM, wherein the register is arranged for storing a supplementary subscriber services handling indicator, indicating in which one of the first and second telecommunications network a supplementary subscriber service of a subscriber is to be executed.

The invention further provides an entity of a first telecommunications network, such as a network switching node, providing call handling support to a subscriber of the first telecommunications network of first and second operatively connected, overlayed telecommunications networks, wherein the entity is arranged for receiving and forwarding a supplementary subscriber services handling indicator and supplementary subscriber services control messages for controlling supplementary subscriber services to be executed in one of the first and second telecommunications networks.

In an embodiment of the invention, the entity is arranged as a Mobile Switching Center MSC for use in the first telecommunications network.

The invention also provides a data management server for use in a second telecommunications network of first and second operatively connected, overlayed telecommunications networks, wherein supplementary subscriber services available to a subscriber in the first telecommunications network may be executed in the second telecommunications network, wherein the data management server is arranged for executing a supplementary subscriber services control message forwarded by the first telecommunications system.

Further embodiments of the arrangement, the NPSRF, the HLR, the MSC and the data management server of the invention are adapted to support and execute the method steps according to any of the embodiments of the method according to the invention as disclosed above.

The above-mentioned and other features and advantages of the invention will be best understood form the following description with reference to the enclosed drawings.

DETAILED DESCRIPTION OF THE EMBODIMENTS

Without the intention of a limitation, the invention will now be explained by its application in a GSM-IMS overlay telecommunications environment, wherein the first telecommunications network is a Public Land Mobile Network PLMN operating in accordance with the Global System for Mobile communications GSM standard, and the second telecommunications network is IMS. However, the invention is generally applicable in radio communication networks, both cellular and cordless, either using circuit switched or packet switched technology, or any of Time Division Multiple Access (TDMA), Frequency Division Multiple Access (FDMA) and Code Division Multiple Access (CDMA).

In the present description and the claims, in general the term subscriber is used for designating a user of telecommunication services. The term subscriber is therefore not limited to a particular contractual relationship between a telecommunication services user or mobile party and a telecommunication services provider or the like.

Figure 1:
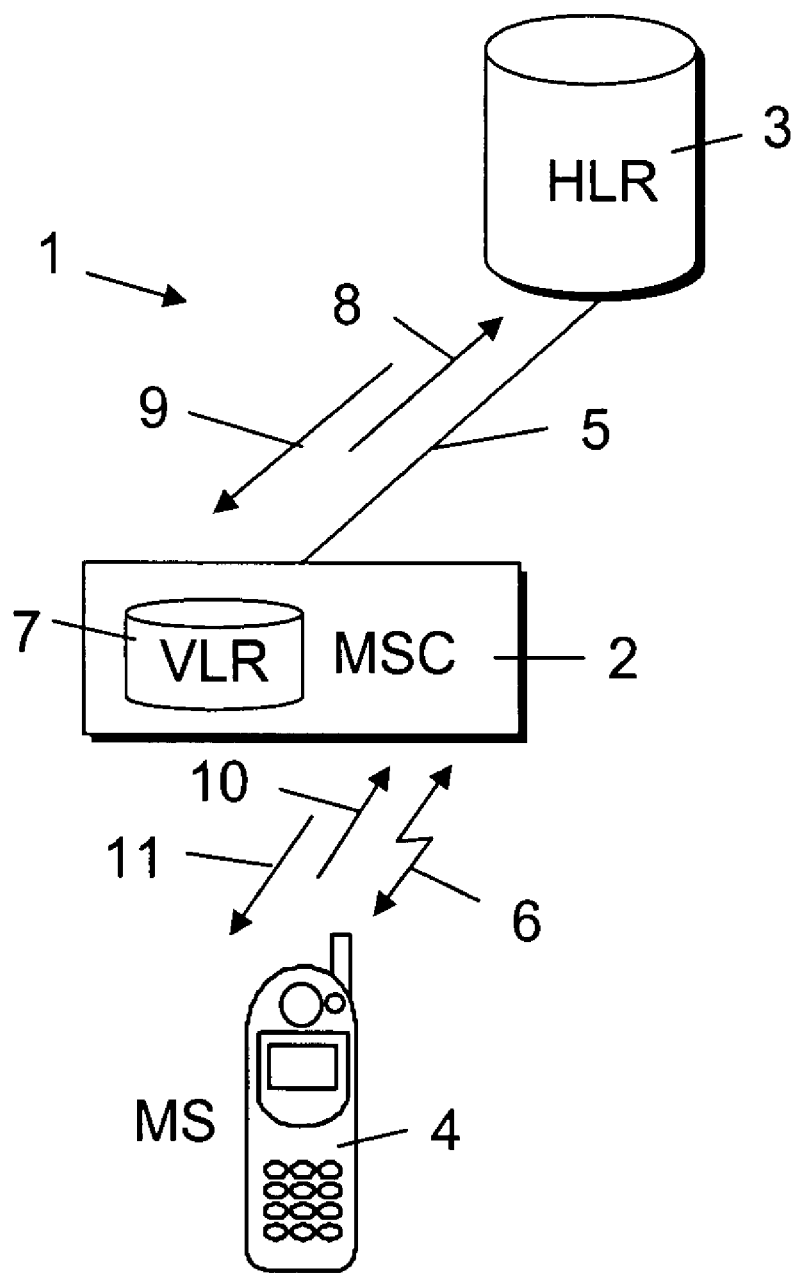
FIG. 1 shows schematically the exchange of subscription data and user initiated supplementary subscriber service control messages in a prior art GSM PLMN.

FIG. 1 shows in a brief schematic manner part of a mobile telecommunications network 1, such as a GSM PLMN, comprising a Mobile Switching Center (MSC) 2, a Home Location Register (HLR) 3 connected to the MSC 2 and a subscriber communication terminal or Mobile Station (MS) 4, shown in the form of a mobile telephone. The MSC 2 may comprise a Visiting Location Register (VLR) 7. Those skilled in the art will appreciate that the GSM PLMN 1 may comprise several geographically spread MSC 2, HLR 3 and subscriber communication terminals or MSs 4 arranged for performing voice and/or non-voice communication services, such as but not limited to facsimile, video, audio and data. The MS 4 operatively connects via a radio link 6 and an intermediate base station (not shown) to the MSC 2. The MSC 2 provides switching support for establishing calls between MSs 4 and fixed subscriber communication terminals (not shown), such as generally known to those skilled in the art.

Besides the exchange of basic telecommunication services such voice and non-voice communications, a telecommunication operator may provide so-called supplementary subscriber services to a subscriber, such as but not limited to call forwarding and call barring. These supplementary services may relate to all or specific basic services.

In the HLR 3, besides information concerning basic services and value added subscription data available to a subscriber, a subscriber profile is stored indicating particularities concerning the availability of supplementary services to a subscriber.

During a location update procedure, i.e. when a subscriber communication terminal is moving in the network 1, the HLR 3 sends 9, upon request 8, supplementary subscriber services subscription data to the MSC 2 for storage in the VLR 7. Once the supplementary subscriber services subscription data, and basic services subscription data and value added services subscription data, have been received and stored at the MSC 2, subscriber supplementary services may be used by the MSC 2 in a call in accordance with the particular supplementary subscriber services subscription data of a subscriber.

In the HLR 3, subscription data are stored in relation to the International Mobile Subscriber Identity (IMSI) of a subscriber. Subscription data are exchanged from the HLR 3 to the MSC 2 using Mobile Application Part (MAP) signaling.

Supplementary subscriber services are subject to service settings. A subscriber may set, modify or query his/her supplementary subscriber service settings in the HLR. Hereto, the MS 4 uses Functional Signaling over the Direct Transfer Application Part (DTAP) interface between the MS 4 and the MSC 2 in a GSM network, indicated by reference numeral 10. The MSC 2 relays 8 the Functional Signaling, encapsulated in MAP messages, to the HLR 3. The HLR 3 processes the commands and returns 9, 11 the result to the subscriber, i.e. the MS 4.

The Functional Signaling over DTAP may be initiated by the subscriber, by entering a dedicated command string at the MS 4, typically starting with *<code>#; refer to 3GPP TS 22.030, section 6.5. The MS 4 recognises the command string and generates corresponding Functional Signaling, i.e. supplementary subscriber control messages. Many GSM phones offer an integrated menu to the user; the user may select an option like "set forwarding destination number". By selecting that option, the MS 4 generates Functional Signaling, including the appropriate service code and other data.

Examples of supplementary subscriber control messages are erase, activate, deactivate, interrogate, get password, register password, etcetera.

Figure 2:
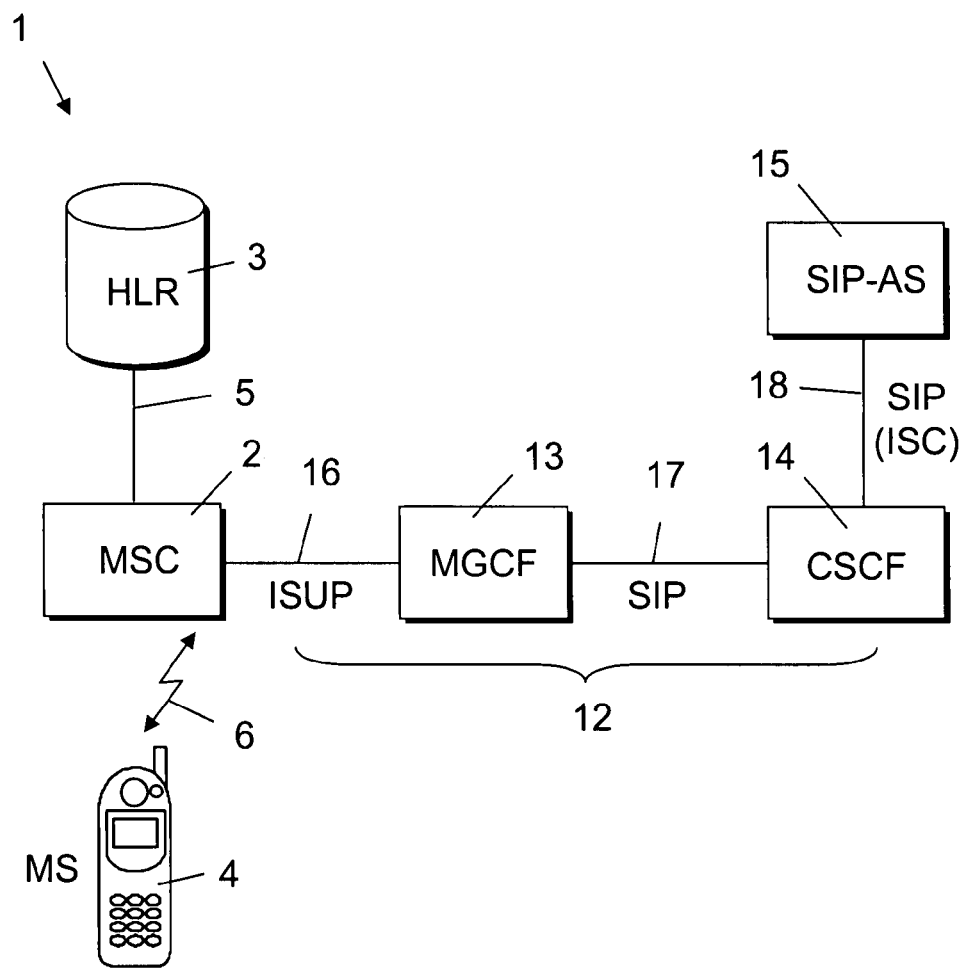
FIG. 2 shows schematically a prior art GSM-IMS overlay network configuration.

The scenario schematically reflected in FIG. 2 is a common situation in a prior art GSM-IMS overlay telecommunications environment. A GSM subscriber may have her call and service control residing in the IP Multimedia Subsystem (IMS) network 12. The GSM network 1 and the IMS 12 are first and second overlayed telecommunications networks, wherein the first network 1 provides classic mobile telecommunications services to a subscriber and the second network 12 is arranged for providing multimedia telecommunications services to the subscriber, such as Internet, Voice-over-IP (VoIP) and many other existing and future services.

Hereto, incoming calls for the GSM subscriber 4 and (optionally) outgoing calls from the GSM subscriber 4 are "overlayed" to the IMS network 12. In the IMS network 4, a service like Wireless Office (WO) is invoked. An example of WO in IMS is commonly known as IP Centrex.

The IMS 12 comprises a Media Gateway Control Function (MGCF) 13, interconnecting the MSC 2 and a CSCF (Call Session Control Function) server 14. The CSCF provides session control for subscribers accessing services within the IMS 12. Information between the MSC 2 and MGCF 13 is exchanged via the well-known ISDN User Part (ISUP) interface 16 and information is exchanged between the MGCF 13 and the CSCF 13 via the well known Session Initiation Protocol (SIP) 17. In essence the CSCF 14 is a SIP Server which has responsibility for interacting with network databases for mobility and Application Servers (AS) 15 for access, authorization and accounting. Messages between the CSCF 14 and AS 15 are exchanged via the IP multimedia subsystem Service Control (ISC) interface 18. The ISC interface carries SIP messages.

When a GSM subscriber is subject to service control in IMS 12, also some of the GSM supplementary subscriber services will be executed by the IMS service. In the first phase of GSM-IMS overlay, it is envisaged that supplementary subscriber services such as Call Forwarding (CF) and Call Barring (CB) will be executed in IMS 12. This has the implication that CF and CB no longer need to be provisioned in the GSM network 1, but only in the IMS network 12.

A GSM subscriber 4 whose call forwarding and call barring services (and call control services) are moved to IMS 12, is accustomed to using specific methods for setting, changing and querying his/her call forwarding and call barring settings in the GSM network as outlined above. However, whereas the execution of these GSM supplementary services and settings is done in IMS 12, the administration commands are still exchanged in the GSM network 1, i.e. sent to the HLR 3 for updating and amending the respective subscriber data profile in the HLR 3. However, the HLR 3 does no longer hold the subscription data for the call forwarding and call barring services; which subscription data has moved to IMS 12.

Hence, the user may receive service unavailability messages or the like and the operator is impaired in his capability to offers seamless user experience when migrating GSM call control and GSM supplementary service control to IMS. Seamless user experience is considered vital for the success of GSM-IMS overlay.

In accordance with the invention, the first telecommunications network, such as a GSM PLMN, is provided with a supplementary subscriber services handling indicator. This, supplementary subscriber services handling indicator indicates in which one of the overlayed telecommunications networks a supplementary subscriber service of a subscriber is to be executed. The supplementary subscriber services handling indicator is stored against subscriber identity data in an entity, such as a register, of the first telecommunications network.

Figure 3:
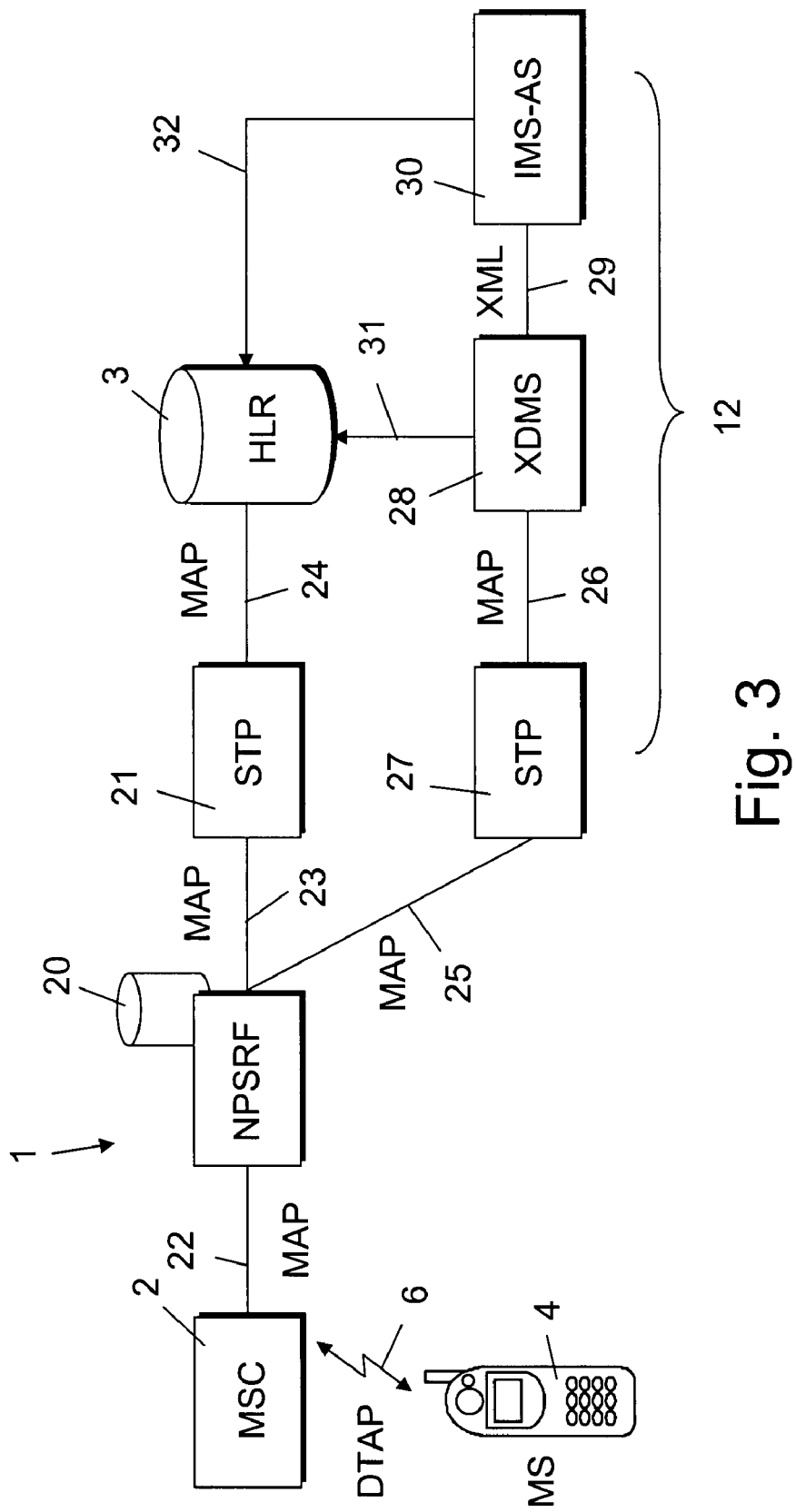
FIGS. 3, 4 and 5 show, in a schematic manner, embodiments of the present invention.

In an embodiment of the invention, as schematically shown in FIG. 3, the supplementary subscriber services handling indicator 20 is advantageously stored in a Number Portability Signaling Relay Function NPSRF register 19 used in a GSM PLMN 1 for determining a HLR 3 of each subscriber of the GSM PLMN 1.

When a subscriber MS 4 performs Location Update, the MSC 2 where the subscriber MS 4 registers uses the IMSI of the MS 4 to construct a Global Title (GT). This GT is used for Signaling Connection Control Part (SCCP) routing of the MAP Location Update message towards the HLR 3 of this subscriber.

The NPSRF register 19 in the Home PLMN of the subscriber intercepts the SCCP message and uses a look-up table to determine the HLR to which this SCCP message shall be sent. Hereto, the NPSRF 19 is provisioned with the look-up table, containing an HLR address for each subscriber of the network 1. In this manner, subscribers or MSs 4 can be moved between HLRs 3, without changing IMSI, i.e. without changing their Subscriber Identity Module (SIM) card.

As schematically shown in FIG. 3, a Signaling Transfer Point (STP) 21 will take care that the GT of the HLR 3 of this subscriber is translated into the Signaling Point Code (SPC) of that HLR. The SCCP message, containing the MAP Location Update message, is then sent to that HLR 3. When the HLR 3 responds to this Location Update, it provides its own address to the MSC 2. Consequently, all subsequent MAP messages 22 that are sent from this MSC 2 towards the HLR 3 of this subscriber MS 4, may be sent directly to this HLR address. Hence, subsequent signaling will not have to be subject to HLR selection; an STP 21 will have to translate the GT of this HLR 3 into the corresponding SPC.

In a practical implementation, an MSC 2 may be configured/coded not to store an HLR address as described above. Consequently, all subsequent Signaling towards HLR would be based on IMSI-derived Global Title. And the NPSRF would then have to derive the HLR address for each MAP message 22 that originates from the MSC 2 and is destined for HLR 3.

Likewise, when an Gateway MSC (GMSC) sends MAP Send Routing Information (SRI) to HLR 3, during terminating call handling, it uses the Mobile Station Integrated Services Digital Network (MSISDN) reference of the called subscriber to construct a GT to be used for SCCP addressing to the HLR 3. The NPSRF 19 takes care that the correct HLR 3 is selected for this subscriber. Hence, the NPSRF 19 also performs mapping between MSISDN and HLR GT.

Between the NPSRF 19 and the STP 21 as well as between the STP 21 and the HLR 3 messages are exchanged using MAP, designated by reference numerals 23, 24, respectively.

As described above, when a subscriber MS 4 in a GSM PLMN 1 is registered in MSC 2, all MAP Signaling originating from that MSC 2 and directed to HLR 3, will be sent to the HLR address that was received during registration. Hence, MAP messages related to GSM supplementary service management are sent to this HLR 3. But as described, that may not be desirable when this subscriber has his/her call forwarding and call barring supplementary services, for example, executed in the IMS network 12.

The present invention, in an embodiment thereof, proposes that the NPSRF 19 be enhanced by the supplementary subscriber services handling indicator 20. When the MSC 2 sends particular MAP messages towards HLR 3, the NPSRF 19 will intercept the SCCP message carrying this MAP message. The NPSRF 19 uses the supplementary subscriber services handling indicator 20 stored in its database to determine whether this MAP message shall be sent to the HLR 3 (as indicated in the GT of this SCCP message) or to another entity, e.g. a Home Subscriber Server (HSS) or an IMS Application Server (IMS-AS) 30 forming part of the overlayed IMS 12. The HSS describes the many database functions that are required in next generation mobile networks.

In this manner, selected MAP messages are sent to the appropriate entity 30 in the IMS network 12 instead of to HLR. This entity 30 in the IMS network 12 shall respond in similar manner to these MAP messages as the HLR 3 does in the current art. As a result, the MSC 2, the MS 4 and hence the user, will not experience differences in controlling supplementary subscriber services, whether or not particular services are envisaged to be executed in the GSM PLMN 1 or the overlayed IMS 12.

MAP messages 25 relating to the control of supplementary subscriber services to be executed in IMS 12 are exchanged between the NPSRF 19 and the IMS-AS 30 via an intermediate STP 27.

In addition, there is no impact on HLR 3. The subscriber's profile does not include call forwarding and call barring settings. MSC-originating MAP messages 22 related to call forwarding or call barring will not end up in this HLR 3, they will be sent to the other entity 30 in the IMS 12.

In the case whereby the MSC 2 does not store the HLR address, subsequent signaling for that HLR 3 will still use IMSI-derived Global Title (GT). Hence, GSM supplementary services related MAP messages will also use IMSI for GT. In such case, the NPSRF 19 would apply its MAP message inspection as described below, also when the routing of the SCCP message destined for HLR 3 is based on IMSI-derived GT.

The NPSRF 19 in the Home PLMN of the GSM subscriber intercepts SCCP messages as per current art. The NPSRF 19 may be configured that for particular destination GT, it has to take certain action. Specifically, when the GT indicates one of this network's HLR, then the NPSRF shall check whether it has to divert this message to another entity. Hereto, the NPSRF 19 shall check whether the SCCP message carries a Transaction Capabilities Application Part (TCAP) Transmission Control (TC) Begin message, TCAP TC_Begin, containing one of the following MAP messages. See table 1.

Current NPSRF implementation allows for using IMSI or MSISDN as user reference (i.e. record index). IMSI is used as index in the case of communication from VLR to HLR; MSISDN is used as index in the case of communication from GMSC to HLR. Table 2 below shows the case where IMSI is used as record index; not all columns are reflected.

For supplementary service administration related communication from VLR to HLR such as MAP-INTERROGATE-SS, the subscriber's IMSI is used for Destination-reference in the Dialogue portion of the TC_Begin message. See 3GPP TS 29.002, section 7.3.1.

The NPSRF will substitute the HLR address by the address of an XML Data Management Server (XDMS) 28 in the IMS network 12. This XDMS provides for message translation of MAP messages 26 exchanged with the NPSRF 19 via STP 21 and the IMS-AS 30 into eXtensible Markup Language (XML), which is the communication protocol for the exchange of information with the IMS-AS 30.

TABLE 1

MAP messages for supplementary service control

MAP_REGISTER_SS
MAP_ERASE_SS
MAP_ACTIVATE_SS
MAP_DEACTIVATE_SS
MAP_INTERROGATE_MS
MAP_REGISTER_PASSWORD
MAP_GET_PASSWORD

TABLE 2

Enhanced User Data in NPSRF

| IMSI | HLR address | Subscriber supplementary service node address |
|---|---|---|
| <imsi 1> | <hlr 1> | XDMS |
| <imsi 2> | <hlr 2> | XDMS |
| <imsi 3> | <hlr 3> | — |
| <imsi 4> | <hlr 4> | — |

In table 2, for subscribers identified by <imsi 1> and <imsi 2> the HLR address is substituted for the XDMS address; <imsi 3> and <imsi 4> relate to subscribers who are not GSM-IMS overlay subscribers; for these subscribers, no XDMS address is configured.

The XDMS 28 contains an aggregation proxy that delivers MAP messages to the appropriate entity in the IMS network for this supplementary service request. Call forwarding and call barring data may e.g. be maintained in an MMTel Application Server.

The XDMS 28 is normally accessed through the Ut reference point. The Ut reference point is specified for communication (service control) between SIP user and SIP application server. The protocol used for the Ut interface is XML Configuration Application Protocol (XCAP). XCAP runs over http (Hypertext Transport Protocol). The actual service management commands in XCAP are represented as XML files.

For the present invention, the XDMS 28 has to convert the MAP message 26 into a corresponding XML file 29, before forwarding the message to the IMS-AS 30, e.g. MMTel server. And vice versa, the IMS-AS 30 or MMTel server responds with an XML file; the XDMS 28 has to convert this to a MAP response message 26.

Alternatively, as an implementation embodiment of the present invention, the enhanced NPSRF 19 may perform the conversion between MAP and XML. However, in general, such task may be better performed by the XDMS 28.

FIG. 3 shows also a link 31 between XDMS 28 and HLR 3, and a link 32 between IMS-AS 30 and HLR 3. Rationale of these links 31, 32 is that not all supplementary service related Signaling shall end up in the IMS-AS. Examples include:

Supplementary Signaling related to call forwarding or call barring for non-voice services, such as fax or data.

When GSM-IMS overlay is applied, it may be restricted to voice calls, for example. Video telephony and other non-voice calls are then still handled in the GSM network 1. So, the GSM supplementary services subscription data for video telephony and other non-voice calls is still provisioned in HLR 3 and sent to MSC 2.

Supplementary Signaling related to services other than call forwarding and call barring.

In such an embodiment, these other service are still executed in the GSM network 1. Examples include Explicit Call Transfer and Call Hold. Therefore, when XDMS 28 receives a MAP message 26 for a service that is still run in the GSM network 1, it may forward the message directly to the HLR 3 via the link 31. As an implementation embodiment of the present invention, the NPSRF 19 can be enhanced to apply this selective forwarding of MAP messages, i.e. the NPSRF would have to check whether or not the MAP messages relates to voice service and whether or not the MAP message relates to call forwarding/call barring or not.

Figure 4:
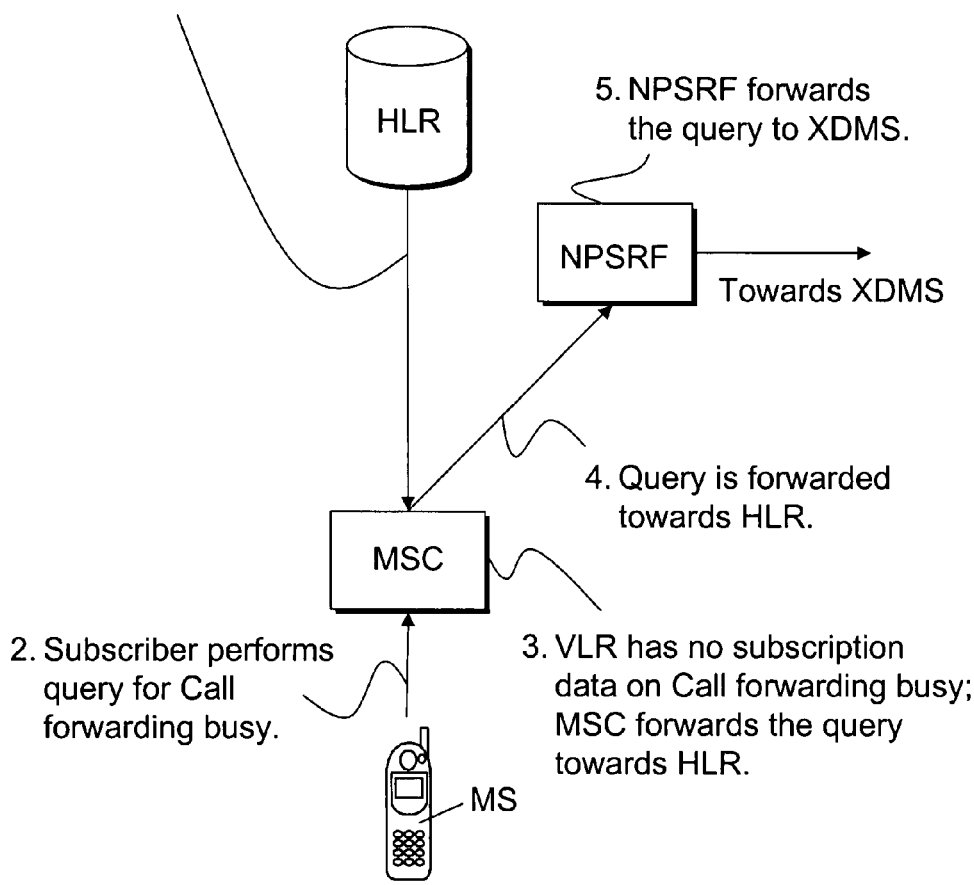

Not all GSM supplementary service control Signaling will be sent form MSC 2 to HLR 3. This distinction is illustrated in FIG. 4.

Suppose a user, via his/her MS, queries the status of the supplementary service Call Forwarding Unconditional (CFU). Since CFU is performed during terminating call handling between GMSC and HLR, the settings of CFU are contained in HLR and are not sent, during a location update of an MS, to the VLR. Therefore, this query for CFU settings is forwarded from MSC to HLR.

Suppose a user queries the status of the supplementary service Call Forwarding Not Reachable (CFNRc). CFRNc may occur in the HLR 3 or in Visited MSC (VMSC). Therefore, during a location update of an MS, the CFNRc settings are sent to the VLR. And therefore, the MSC may respond to this query for CFNRc settings, without forwarding the request to the HLR.

However, when the GSM subscriber has her Call Forwarding service migrated to the overlayed network, e.g. IMS, and that subscriber does not have Call Forwarding subscription data in HLR, then the VLR will not have Call Forwarding settings. The MSC may therefore, when receiving a query for Call Forwarding Not Reachable status, still respond directly to the subscriber with an indication that the subscriber has no call forwarding service subscribed.

To resolve this issue, the present invention in a further embodiment thereof proposes that for the GSM-IMS overlay subscribers, the supplementary subscriber services handling indicator is arranged to indicate that the MSC will forward all GSM supplementary service query or control commands to the HLR. To this end a parameter called "HLR_directed_service_query_required" may be provided with the subscriber services handling indicator. As described above, in accordance with the present invention, this query will then be sent to the XDMS instead of to the HLR. The several steps disclosed above are briefly indicated in FIG. 4 as steps 1.-5.

Figure 5:
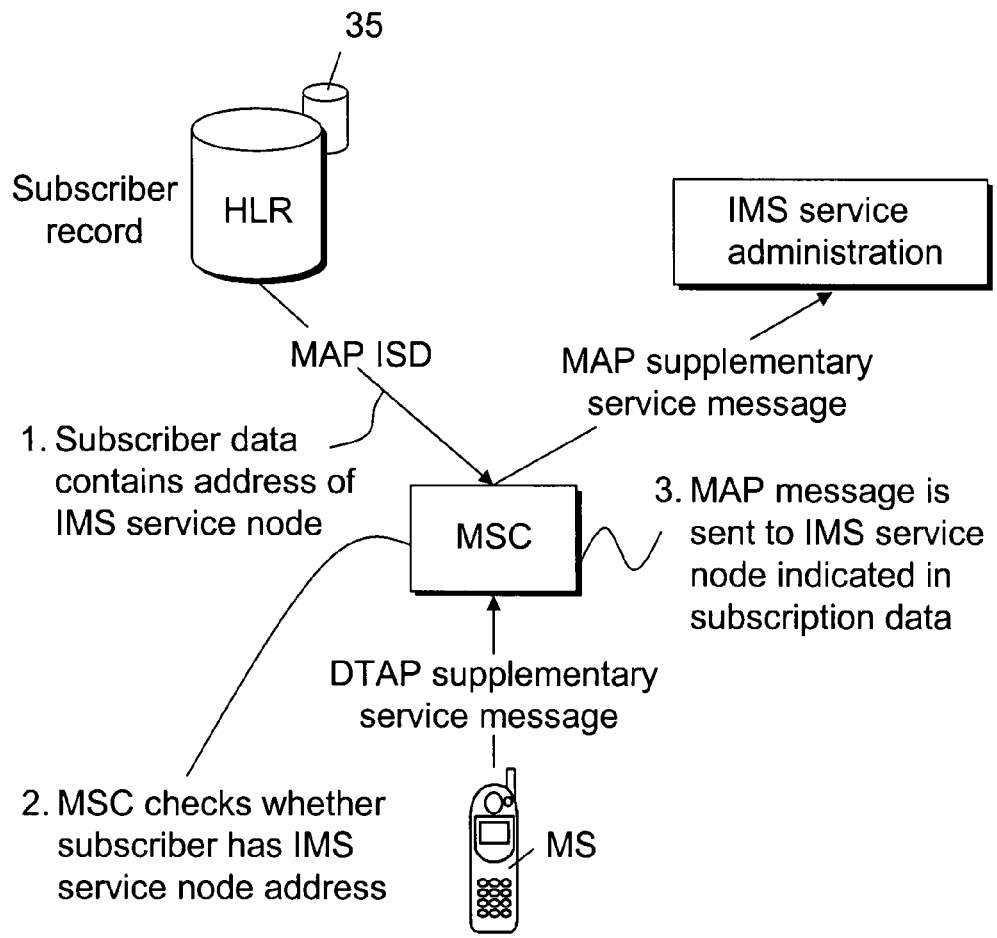

With reference to FIG. 5, the present section describes how the service node address, to which the MAP messages related to supplementary service control shall be sent, can be made available in the MSC.

In this embodiment, it is envisaged that the supplementary subscriber services handling indicator of the invention is stored as a data element in the subscriber's record in the HLR, for supplementary service management, in FIG. 5 schematically indicated by reference numeral 35. The supplementary subscriber services handling indicator 35 indicates for which supplementary services the MAP messages shall be directed to a service node in IMS, in general the second telecommunications network of first and second overlayed telecommunications networks.

In addition, the actual address of this service node is included in the supplementary subscriber services handling indicator 35. The supplementary subscriber services handling indicator 35 is included in the subscriber data that is sent to VLR during location update. When the MSC is processing an administrative supplementary service request, the MSC checks whether the subscriber's data in VLR contains the supplementary subscriber services handling indicator 35. The MSC then checks whether the supplementary subscriber services handling indicator 35 indicates that for this administrative supplementary service request the MAP signaling shall be directed to a service node or service entity, instead of sending it to the HLR or processing it locally. The request is then sent directly to the indicated service node or service entity, such as an IMS service application server or data management server, such as the IMS-AS 30 in the second telecommunications network, without the need for specific action by the NPSRF.

Figure 6:
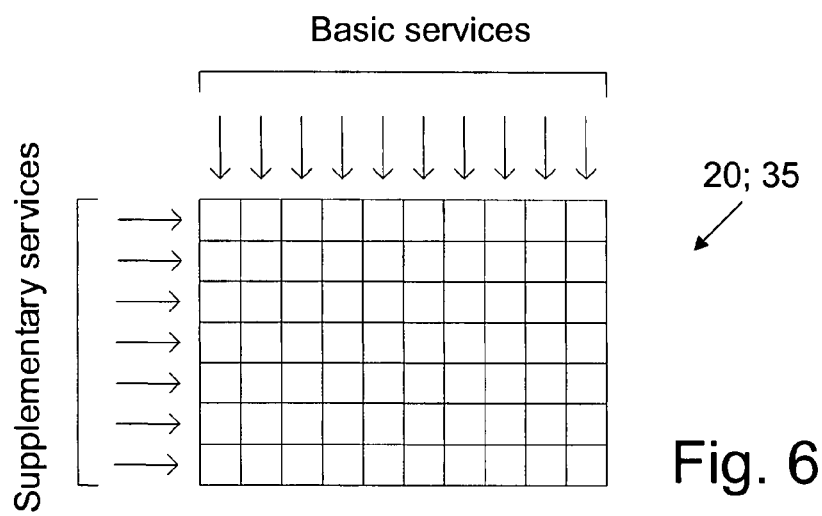
FIG. 6 shows a structure of a supplementary subscriber services handling indicator in accordance with the present invention.

FIG. 6 shows structure of the supplementary subscriber services handling indicator according to the present invention. In this figure, Service Node address is not reflected, but will be a regular SS7 address string.

The supplementary subscriber services handling indicator 25; 35 takes the form of a matrix, the rows of which indicate a particular supplementary subscriber service, such as call forwarding, call barring, and the like, and the columns of which indicate basic services, such as voice, data, fax, synchronous data transfer, etcetera.

The cells of the matrix contain information as to which network of the first and second overlaid telecommunications networks is handling or executing a particular supplementary subscriber service.

Rationale of this structure is that for each supplementary service, a set of basic services is indicated for which the supplementary service management signaling shall be directed to a service node. For example, the following supplementary services and basic services may be included in the supplementary subscriber services handling indicator in accordance with the present invention:

Call forwarding: TS11 (speech), TS61 (speech/fax), TS62 (Fax); BS30 (synchronous data)

Call barring: TS11, TS61, TS62, BS30

In the above example, call forwarding and call barring is performed in IMS for a subset of the available basic services, namely for speech, fax and synchronous data (which may be used for video telephony). In a later stage, the operator may enhance the service offering in IMS and include also Explicit Call Transfer, Call Hold, Call Waiting and Multi Party, for all applicable basic services. In that case, the data element would have the following structure:

Call forwarding: All
Call barring: All
Explicit Call Transfer: All
Call Hold: All
Call Waiting: All
Multi Party: All According to the above-described embodiment of the invention, shifting additional services to IMS will not impact HLR or MSC implementation. HLR and MSC are prepared to direct any supplementary service administrative request to an IMS service administration node, as defined in the supplementary subscriber services handling indicator. When shifting an additional supplementary service to IMS, the operator will mark that supplementary service in the supplementary subscriber services handling indicator 25; 35 in the subscriber's subscription record in the HLR.

From the above it will be clear that GSM subscribers, in an GSM-IMS overlay, who have their call control and supplementary subscriber service control execution, notably call forwarding and call barring, shifted to IMS, can keep on using their user interface from the GSM phone for managing their supplementary services. They will not experience a change in service control.

Although two particular embodiments have been proposed, i.e. based on NPSRF and HLR storage of the supplementary subscriber services handling indicator and the corresponding arrangements and modifications in the network entities, and signaling messages, those skilled in the art will appreciate that the benefits of the invention in applying a supplementary subscriber services handling indicator may be advantageously applied in other specific implementations, which are intended to be covered by the attached claims.

The invention claimed is:

1. A method of controlling supplementary subscriber services in first and second operatively connected, overlaid telecommunications networks, wherein supplementary subscriber services available to a subscriber in said first telecommunications network are executed in said second telecommunications network, said supplementary subscriber services being controlled by said subscriber from said first telecommunications network, said first telecommunications network is provided with a supplementary subscriber services handling indicator that indicates in which one of said first and second telecommunications networks a supplementary subscriber service of a subscriber is to be executed, the method comprising the steps of:

storing said supplementary subscriber services handling indicator as a data element in a register of said first telecommunications network;

at the receipt of a supplementary subscriber services control message of a subscriber in said first telecommunications network, said stored supplementary subscriber services handling indicator being checked to determine in which one of said first and second telecommunications networks said supplementary subscriber services control message has to be processed;

executing in a data management server in the second telecommunications network the supplementary subscriber services control message forwarded by said first telecommunications network; and configuring the data management server to forward to said first telecommunications network a supplementary subscriber services control message relating to a supplementary subscriber service not envisaged to be executed by said second telecommunications network.

2. The method according to claim 1, further comprising checking said stored supplementary subscriber services handling indicator to determine whether said supplementary subscriber services control message has to be forwarded for processing by said second telecommunications network.

3. The method according to claim 1, further comprising configuring said supplementary subscriber services handling indicator for indicating that each supplementary subscriber services control message is to be forwarded to said second telecommunications network.

4. The method according to claim 3, wherein said supplementary subscriber services handling indicator indicates that each supplementary subscriber services control message shall be first forwarded to an entity in said first telecommunications network, and subsequently forwarded to said second telecommunications network.

5. The method according to claim 1, further comprising configuring said supplementary subscriber services handling indicator for selectively indicating which supplementary subscriber services control message is to be forwarded to one of said first and second telecommunications networks.

6. The method according to claim 5, further comprising configuring said supplementary subscriber services handling indicator for selectively indicating which supplementary subscriber services control message relating to a specific basic service of a supplementary subscriber service is to be forwarded to one of said first and second telecommunications networks.

7. The method according to claim 1, wherein said supplementary subscriber services handling indicator is stored in said register of said first telecommunications network associated with a subscriber identification.

8. The method according to claim 7, further comprising configuring said register for forwarding said supplementary subscriber services handling indicator to an entity of said first telecommunications network, wherein said entity includes a network switching node providing call handling support to a subscriber of said first telecommunications network.

9. The method according to claim 7, further comprising configuring said register as a lookup table.

10. The method according to claim 7, further comprising configuring said register for converting the supplementary subscriber services control message for processing in said second telecommunications network, and for converting a response message received from the second telecommunications network into a response message for processing in said first telecommunications network.

11. The method according to claim 1, wherein said first telecommunications network is a Public Land Mobile Network (PLMN), operating in accordance with the Global System for Mobile communications (GSM), and wherein said register is a Number Portability Signaling Relay Function (NPSRF) register of said PLMN configured to determine a Home Location Register (HLR) of each subscriber of said PLMN.

12. The method according to claim 7, wherein said first telecommunications network is a Public Land Mobile Network (PLMN) operating in accordance with the Global System for Mobile communications (GSM), and wherein said register is a Home Location Register (HLR) of a subscriber of said PLMN.

13. The method according to claim 1, further comprising configuring said data management server for converting the supplementary subscriber services control message forwarded by said first telecommunications network for execution by said second telecommunications network.

14. The method according to claim 1, wherein said second telecommunications network is an IP Multimedia Subsystem (IMS) telecommunications network.

15. An arrangement for controlling supplementary subscriber services in first and second operatively connected, overlaid telecommunications networks wherein supplementary subscriber services available to a subscriber in said first telecommunications network may be executed in said second telecommunications network, and said supplementary subscriber services are controlled by said subscriber from said first telecommunications network, and said first telecommunications network is provided with a supplementary subscriber services handling indicator for indicating in which one of said first and second telecommunications networks a supplementary subscriber service of a subscriber is to be executed, wherein the arrangement comprises:
said first telecommunications network configured to store said supplementary subscriber services handling indicator as a data element in a register of said first telecommunications network and to check said supplementary subscriber services handling indicator stored in said first telecommunications network to determine, at the receipt of a supplementary services control message of a subscriber in said first telecommunications network, in which one of said first and second telecommunications networks said supplementary subscriber services control message has to be processed; and
a data management server in said second telecommunications network configured to execute the supplementary subscriber services control message forwarded by said first telecommunications network and to forward to said first telecommunications networks a supplementary subscriber services control message relating to a supplementary subscriber service not envisaged to be executed by said second telecommunications network.

16. The arrangement according to claim 15, wherein said first telecommunications network is configured to check whether said subscriber services control message has to be forwarded for processing by said second telecommunications network.

17. The arrangement according to claim 16, wherein said supplementary subscriber services handling indicator is configured to indicate that each supplementary subscriber services control message is to be forwarded to said second telecommunications network.

18. The arrangement according to claim 17, wherein said supplementary subscriber services handling indicator is configured to indicate that each supplementary subscriber services control message shall be first forwarded to an entity in said first telecommunications network, and wherein said entity is configured to subsequently forward said supplementary subscriber services control messages to said second telecommunications network.

19. The arrangement according to claim 15, wherein said supplementary subscriber services handling indicator is configured to selectively indicate which supplementary subscriber services control message is to be forwarded to one of said first and second telecommunications networks.

20. The arrangement according to claim 19, wherein said supplementary subscriber services handling Indicator is configured to selectively indicate which supplementary subscriber services control message relating to a specific basic service of a supplementary subscriber service is to be forwarded to one of said first and second telecommunications networks.

21. The arrangement according to claim 15, wherein said supplementary subscriber services handling indicator is stored in said register of said first telecommunications network associated with a subscriber identification.

22. The arrangement according to claim 21, wherein said register is configured to send said supplementary subscriber services handling indicator to an entity of said first telecommunications network, wherein said entity includes a network switching node providing call handling support to a subscriber of said first telecommunications network.

23. The arrangement according to claim 21, wherein said register is configured as a look-up table.

24. The arrangement according to claim 21, wherein said register is configured to convert the supplementary subscriber services control message for processing in said second telecommunications network, and for converting a response message received from the second telecommunications network into a response message for processing in said first telecommunications network.

25. The arrangement according to claim 21, wherein said first telecommunications network is a Public Land Mobile Network (PLMN) operating in accordance with Global System for Mobile communications (GSM), and wherein said register is a Number Portability Signaling Relay Function (NPSRF) register of said PLMN configured to determine a Home Location Register (HLR) of each subscriber of said PLMN.

26. The arrangement according to claim 21, wherein said first telecommunications network is a Public Land Mobile Network (PLMN) operating in accordance with the Global System for Mobile communications and said register is a Home Location Register of a subscriber of said PLMN.

27. The arrangement according to claim 15, wherein said data management server is configured to convert the supplementary subscriber services control message forwarded by said first telecommunications network for execution by said second telecommunications network.

28. The arrangement according to claim 15, wherein said second telecommunications network is an IP Multimedia Subsystem (IMS) telecommunications network.

29. A Number Portability Signaling Relay Function (NPSRF) register for use in a Public Land Mobile Network (PLMN) operating in accordance with Global System for Mobile communications (GSM), wherein a first network of first and second operatively connected, overlaid telecommunications networks is a GSM network, wherein supplementary subscriber services available to a subscriber in said first telecommunications network may be executed in said second telecommunications network, said supplementary subscriber services being controlled by said subscriber from said first telecommunications network, and said first telecommunications network is provided with a supplementary subscriber services handling indicator for indicating in which one of said first and second telecommunications networks a supplementary subscriber service of a subscriber is to be executed, wherein:

said register is configured to determine a Home Location Register (HLR) of each subscriber of said PLMN;

said register is configured to store said supplementary subscriber services handling indicator as a data element, such that said stored supplementary subscriber services handling indicator is checked to determine, at the receipt of a supplementary services control message of a subscriber in said first telecommunications network, in which one of said first and second telecommunications networks said supplementary subscriber services control message has to be processed; and said second telecommunications network includes data management server configured to execute the supplementary subscriber services control message forwarded by said first telecommunications network and to forward to said first telecommunications networks a supplementary subscriber services control message relating to a supplementary subscriber service not envisaged to be executed by said second telecommunications network.

30. The NPSRF register according to claim 29, wherein said supplementary subscriber services handling indicator is configured in a matrix form, including a one-dimensional matrix.

31. A Home Location Register, (HLR) for use in a Public Land Mobile Network (PLMN) operating in accordance with Global System for Mobile communications (GSM), wherein a first network of first and second operatively connected, overlaid telecommunications networks is a GSM network, wherein supplementary subscriber services available to a subscriber in said first telecommunications network are executed in said second telecommunications network, said supplementary subscriber services being controlled by said subscriber from said first telecommunications network, and said first telecommunications network being provided with a supplementary subscriber services handling indicator for indicating in which one of said first and second telecommunications networks a supplementary subscriber service of a subscriber is to be executed, wherein:

the HLR is configured to store said supplementary subscriber services handling indicator as a data element, such that said stored supplementary subscriber services handling indicator is checked to determine, at the receipt of a supplementary services control message of a subscriber in said first telecommunications network, in which one of said first and second telecommunications networks said supplementary subscriber services control message has to be processed, wherein the HLR is the HLR of the subscriber; and said second telecommunications network includes data management server configured to execute the supplementary subscriber services control message forwarded by said first telecommunications network and to forward to said first telecommunications networks a supplementary subscriber services control message relating to a supplementary subscriber service not envisaged to be executed by said second telecommunications network.

32. The HLR in accordance with claim 31, wherein said subscriber services handling indicator is stored as a data element in a subscribers record in said HLR.

33. A network switching node of a first telecommunications network, providing call handling support to a subscriber of the first telecommunications network of first and second operatively connected, overlaid telecommunications networks, wherein supplementary subscriber services available to a subscriber in said first telecommunications network are be executed in said second telecommunications network, wherein said supplementary subscriber services are controlled by said subscriber from said first telecommunications network, and said first telecommunications network is provided with a supplementary subscriber services handling indicator for indicating in which one of said first and second telecommunications networks a supplementary subscriber service of a subscriber is to be executed, wherein:

said network switching node is configured to receive and forward a supplementary subscriber services handling indicator stored in a register of said first telecommunications network and supplementary subscriber services control messages for controlling supplementary subscriber services to be executed in one of said first and second telecommunications networks in accordance with said stored supplementary subscriber services handling indicator; and said second telecommunications network includes a data management server configured to execute the supplementary subscriber services control message forwarded by said first telecommunications network and to forward to said first telecommunications networks a supplementary subscriber services control message relating to a supplementary subscriber service not envisaged to be executed by said second telecommunications network.

34. The network switching node according to claim 33, wherein said network switching node is a Mobile Switching Center.

* * * * *

UNITED STATES PATENT AND TRADEMARK OFFICE
CERTIFICATE OF CORRECTION

PATENT NO. : 8,374,589 B2  
APPLICATION NO. : 12/527315  
DATED : February 12, 2013  
INVENTOR(S) : Noldus et al.

Page 1 of 1

It is certified that error appears in the above-identified patent and that said Letters Patent is hereby corrected as shown below:

On the title page, in item (73), under "Assignee", in Column 1, Line 1,
delete "Ericsson," and insert -- Ericsson (publ), --, therefor.

In the Specification

In Column 11, Line 31, delete "MMTcI" and insert -- MMTel --, therefor.

In Column 11, Line 42, delete "MMTeI" and insert -- MMTel --, therefor.

In Column 11, Line 43, delete "or MMTeI server" and insert -- or MMTel server --, therefor.

In the Claims

In Column 17, Line 39, in Claim 29, delete "includes data" and insert -- includes a data --, therefor.

In Column 18, Line 15, in Claim 31, delete "includes data" and insert -- includes a data --, therefor.

Signed and Sealed this  
Twenty-fourth Day of December, 2013

Margaret A. Focarino  
*Commissioner for Patents of the United States Patent and Trademark Office*